United States Patent
El-Hoiydi et al.

(10) Patent No.: US 10,534,573 B2
(45) Date of Patent: Jan. 14, 2020

(54) METHOD FOR APPARATUS FOR SAMPLE RATE CONVERSION WITH UNKNOWN INPUT AND OUTPUT CLOCKS

(71) Applicant: Sonova AG, Staefa (CH)

(72) Inventors: Amre El-Hoiydi, Neuchatel (CH); Timothee Jost, Auvernier (CH); Till Schmalmack, Maur (CH); Jordi Hidalgo, Bern (CH); Alessandro Gallo, Murten (CH)

(73) Assignee: Sonova AG, Staefa (CH)

( * ) Notice: Subject to any disclaimer, the term of this patent is extended or adjusted under 35 U.S.C. 154(b) by 44 days.

(21) Appl. No.: 15/990,846

(22) Filed: May 29, 2018

(65) Prior Publication Data

US 2019/0369947 A1 Dec. 5, 2019

(51) Int. Cl.
  *G06F 3/16* (2006.01)
  *H04R 3/00* (2006.01)
(52) U.S. Cl.
  CPC .............. *G06F 3/165* (2013.01); *H04R 3/00* (2013.01); *H04R 2420/07* (2013.01)
(58) Field of Classification Search
  USPC ..... 381/6, 14, 16, 55, 71.11, 71.12, 77, 104, 381/311, 379, 411
  See application file for complete search history.

(56) References Cited

U.S. PATENT DOCUMENTS

| | | | |
|---|---|---|---|
| 7,743,183 B2* | 6/2010 | Virdi | H04L 29/06027 365/189.05 |
| 8,817,725 B2 | 8/2014 | Blackberry | |
| 9,894,445 B2 | 2/2018 | Sennheiser | |
| 2007/0008984 A1* | 1/2007 | Philips | G06F 5/14 370/412 |
| 2011/0129048 A1 | 6/2011 | Parrot | |
| 2016/0321028 A1* | 11/2016 | Doerbecker | G10L 21/055 |

FOREIGN PATENT DOCUMENTS

EP   2394382 A1   6/2011
WO   2016153652 A1   9/2016

* cited by examiner

*Primary Examiner* — Yosef K Laekemariam

(57) ABSTRACT

Systems, methods and software for sample rate conversion with unknown input and output clocks are disclosed. In one embodiment, a method for an asynchronous transfer of audio data includes: receiving the audio data by an antenna of a receiver (RX); storing the audio data in an input buffer of the RX; and receiving data words from the input buffer by a sample rate converter (SRC). The consecutive data words are received from the input buffer at an adjustable period T. The method further includes tracking a filling level of the input buffer; and based on the filling level of the input buffer, adjusting the adjustable period T. When the filling level of the input buffer is below the target level of the input buffer, the adjustable period T is increased. When the filling level of the input buffer is above the target level of the input buffer, the adjustable period T is decreased.

20 Claims, 8 Drawing Sheets

METHOD FOR APPARATUS FOR SAMPLE RATE CONVERSION WITH UNKNOWN INPUT AND OUTPUT CLOCKS

FIELD OF THE INVENTION

The inventive technology relates generally to audio data streams, and more particularly relates to methods and apparatuses for adjusting data conversion rate when a transmitter and receiver exchange data asynchronously.

BACKGROUND

Conventional wireless audio devices can exchange packets of audio data. For example, a wireless transmitter (TX) may send audio data to a wireless receiver (RX) for a playback. The wireless link between the TX and the RX is often asynchronous, i.e., the RX receives and plays the audio stream without being synchronized with the speed of the data transmission at the TX. An example of such asynchronous communication is Advanced Audio Distribution Profile (A2DP) protocol, where the data are transferred between the TX and the RX using a Bluetooth standard or protocol. In operation, audio packets are received by the RX at irregular intervals, and are buffered locally on the RX while being constantly consumed and played by the RX. In practical applications, the buffer is necessary to support the asynchronous reception of new data and to provide some robustness against sudden changes in data throughput caused by degraded connectivity. The size of the buffer on the RX is not mandated by the Bluetooth specifications, but most devices on the market adopt a buffer having a capacity corresponding to about 150-200 milliseconds (ms) of audio data stream as a trade-off among robustness, playback latency and on-chip memory footprint.

FIG. 1 is a schematic view of communication between a TX 30 (also referred to as a "source") and an RX 40 (also referred to as a "sink") in accordance with conventional technology. The TX 30 may be an A2DP source that asynchronously transmits data to the RX 40. Because of the asynchronous transmission, data rates at the RX cannot be derived based on the protocol timing.

In operation, the source 30 transmits audio data over an antenna 34 at a rate that is controlled by a clock 32 ("CLOCK1"). The audio data are wirelessly transmitted to an antenna 44 of the RX 40. Generally, the frequencies of the CLOCK1 of the TX and a clock 42 ("CLOCK2") of the RX are not synchronized. Therefore, the received audio data are processed using a sample rate converter (SRC) 46 that takes into account the differences in the frequencies of CLOCK1 and CLOCK2. The processed data are sent to a digital-to-analog converter (DAC) 47, and further to a speaker 48 for, e.g., sound output.

However, the frequency of the CLOCK1 may drift over time, making it difficult for the RX 40 to reliably reproduce the data at a speaker 48. For example, some conventional sources 30 include clocks that drift about 140 part-per-million (ppm). The CLOCK2 may also drift. Therefore, many conventional RX-es use buffers to store the data from the TX before processing.

FIG. 2 is a graph 200 showing a filling level for data buffer in accordance with conventional technology. The horizontal axis represents time in seconds. The vertical axis represents buffer filling level. For example, the buffer filling level of 0.15 on the vertical axis corresponds to the amount of data that the buffer would store after 0.15 second worth of receiving the audio stream without any consumption of the buffered data by the SRC 46. As another example, a sudden drop (denoted by numeral 10) of the buffer filling level from the level of about 0.18 second to about 0.055 second corresponds to the consumption of about 0.125 second worth of the audio data without any new data being received by the buffer. The sudden drop 10 may result from a failed reception of the data by the RX, followed by a successful re-transmission of the audio data. Therefore, the jagged short-term oscillations of the buffer level are caused by the failed transmissions followed by the re-transmissions.

A trend line 20 corresponds to a long-term trend of the buffer filling level. In general, the buffer tends to either overflow or underflow because of the divergence between CLOCK1 and CLOCK2 (e.g., caused by frequency drift) and/or because of failed transmissions followed by retransmissions of the packets of audio data. With some conventional technologies, data overflow can happen in less than 10 minutes of playback. In some cases, the buffer may overflow even earlier, because the normal working level of the buffer is set close to a full level to make the RX more robust against unsuccessful data transmissions.

Some conventional technologies use a "sample add and drop" approach where the RX discards the audio data when the filling level of the buffer is close to its upper bound, and the RX duplicates the audio data when the filling level is close to it lower bound. However, this brute-force approach causes audible artefacts, as illustrated in a spectrogram 300 of FIG. 3. The horizontal axis of the spectrogram corresponds to the audio playback time in seconds. The vertical axis corresponds to frequencies of the audio signal as played by, for example, the speaker 48 in FIG. 1. The spectrogram 200 shows a pure tone 62 that was emitted by the source, received by the RX, and played by the speaker. The pure tone 62 occupies a relatively narrow-band tone at about 1.7 kHz. However, when the "sample add and drop" method is used to control the filling level of the buffer, the audio stream generates undesirable noise 64 that can be typically heard as clicks at the speaker.

Some conventional technologies attempt to constantly adjust the frequency of CLOCK2 to better regulate the filling level of the buffer to supplement the "sample add and drop" method, and, therefore, reduce the noise in the audio stream. However, those conventional methods are predicated on the a-priori knowledge of the true frequencies of both CLOCK1 and CLOCK2, which is not always the case with the wireless data transmission standards. Accordingly, there remains a need for methods and systems for wireless communication between the source of the audio data and the RX where the filling level of the buffer can be controlled, while the audible noise is reduced.

DESCRIPTION OF THE DRAWINGS

The inventive technology will become more readily appreciated by reference to the following detailed description, when taken in conjunction with the accompanying drawings, wherein.

DETAILED DESCRIPTION

Figure 1:
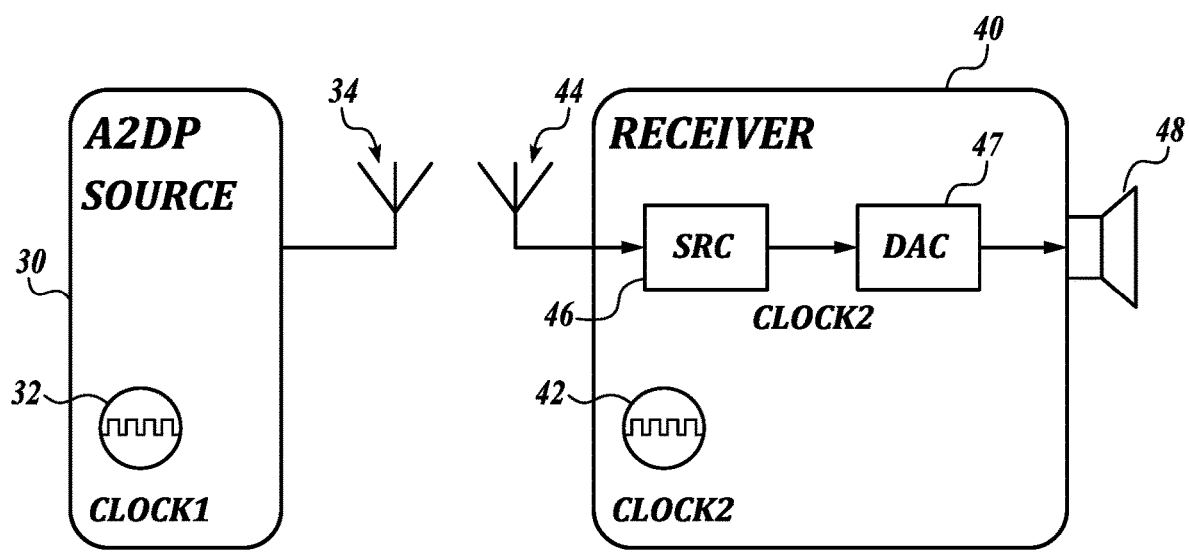
FIG. 1 is a schematic view of communication between a transmitter (TX) and a receiver (RX) in accordance with conventional technology.
Figure 2:
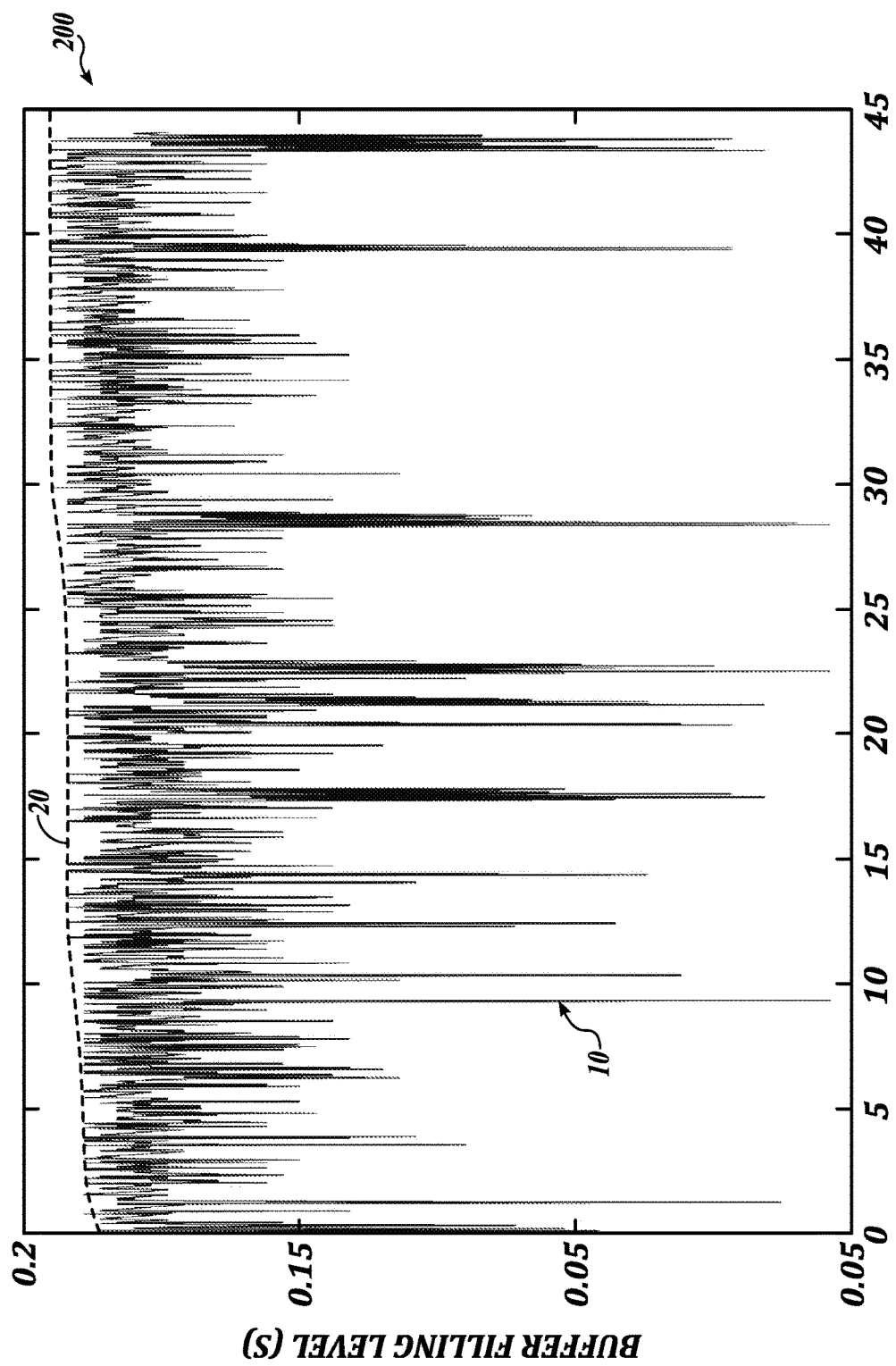
FIG. 2 is a graph of a filling level for data buffer in accordance with conventional technology.
Figure 3:
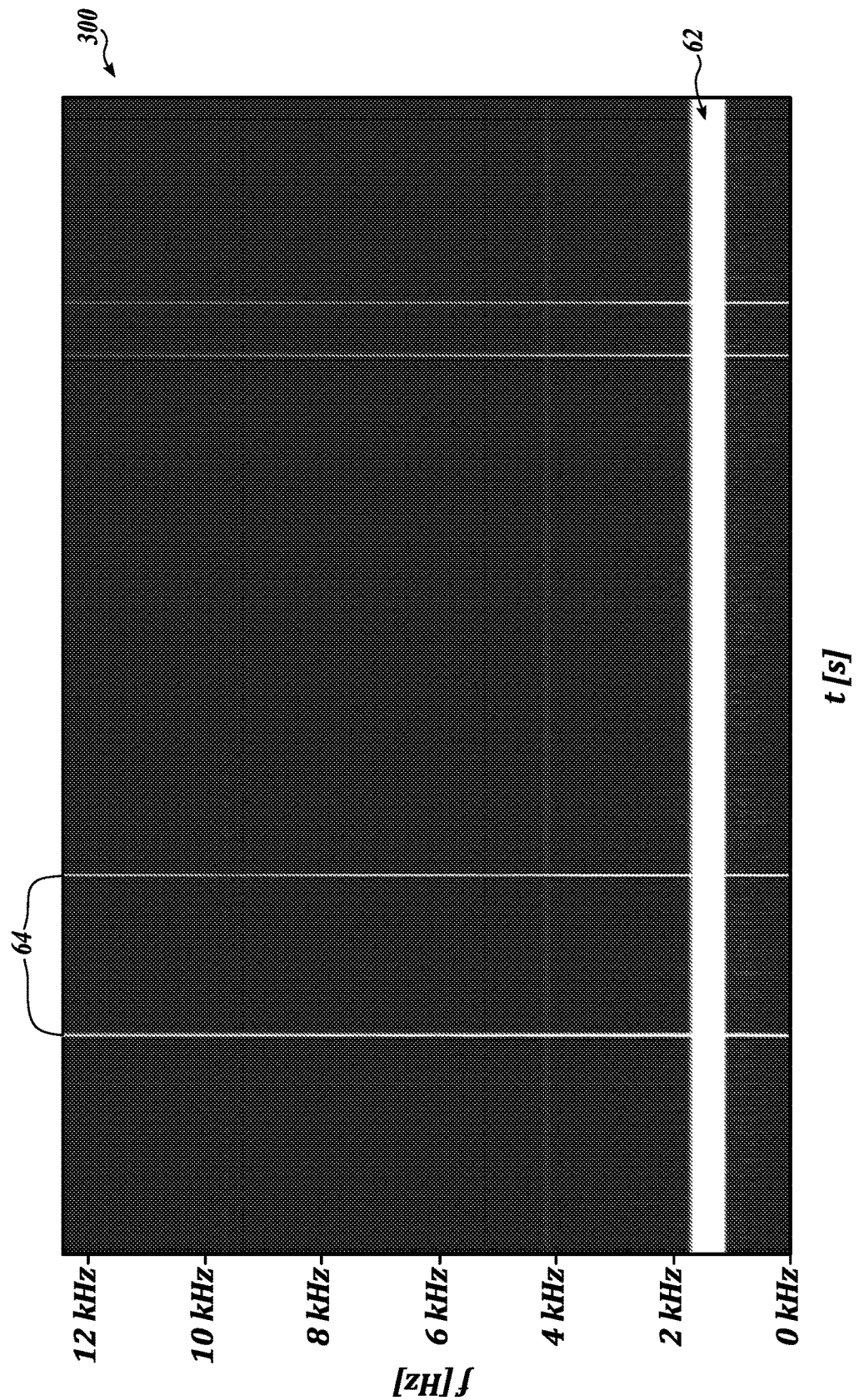
FIG. 3 is a spectrogram of a pure tone stream in accordance with conventional technology.

The inventive technology is directed to processing of wireless data, for example, an audio stream. In some embodiments, the audio stream is wirelessly transmitted from a transmitter (TX or a source), asynchronously received by a receiver (RX or a sink), and stored in an input buffer of the RX. Some non-limiting examples of an RX are a hearing aid, an ear-worn earbud, and a head-worn headset. The TX clock and the RX clock may operate at different frequencies with the RX not knowing a precise frequency of the TX clock because of, for example, a drift of the TX clock.

In some embodiments, the RX includes a sample rate converter (SRC) for processing the audio stream. In operation, the SRC draws data (also referred to as withdrawing data or receiving data by the SRC) from the input buffer, processes the data (e.g., audio stream or audio data), and sends the data to an output buffer, wherefrom the audio stream is sent further, for example, to a host having an audio speaker for the playback. The SRC may consume data from the input buffer in certain increments ("data words").

In some embodiments, the SRC receives data words from the input buffer at an adjustable period T. In operation, the SRC digitally resamples data words from the input buffer to the data words (e.g., audio stream) that are stored in the output buffer before the audio play. For example, the SRC may process a data word that includes M data points into another data word (audio stream) that includes N data points.

In some embodiments, the SRC adjusts the rate of drawing and processing audio data based on the level of the input buffer and the output buffer. For example, when the level of the input buffer exceeds a predetermined threshold, the adjustable period T between acquisitions of the data words from the input buffer can be shortened by a predetermined increment $\Delta T$. Conversely, when the level of the input buffer becomes too low, the adjustable period T can be made longer by $\Delta T$ to bring the level of the input buffer up.

In some embodiments, when the level of the output buffer drops below a predetermined level, the SRC may decrease the resampling ratio M:N to produce more data for the output buffer, thus increasing the filling level of the output buffer, and vice versa. In some embodiments, the SRC may combine these changes in the period T and the resampling ratio M:N to control the filling levels for both the input and output buffers. In some embodiments, the input to the SRC is smoothed by digital filters to improve a control of the filling levels of the input/output buffers.

In one embodiment, a method for an asynchronous transfer of audio data includes receiving the audio data by an antenna of an RX. The audio data is sent wirelessly from a TX. The method also includes storing the audio data in an input buffer of the RX; and receiving data words from the input buffer by an SRC. The consecutive data words are received from the input buffer at an adjustable period T. The method also includes tracking a filling level of the input buffer; and based on the filling level of the input buffer, adjusting the adjustable period T.

In one aspect, the filling level of the input buffer is compared to a target level of the input buffer. In another aspect, adjusting the adjustable period T includes: increasing the adjustable period T when the filling level of the input buffer is below the target level of the input buffer; and decreasing the adjustable period T when the filling level of the input buffer is above the target level of the input buffer.

In one aspect, before comparing the filling level of the input buffer to the target level of the input buffer, the data words are processed with a moving-average filter. In another aspect, processing the data words from the input buffer by the SRC includes resampling of the data words.

In another aspect, a method includes: tracking a filling level of the output buffer; comparing the filling level to the output buffer with a target level of the output buffer; and based on comparing the filling level to the output buffer with the target level of the output buffer, adjusting a resampling ratio $R_{SRC}$. In one aspect, adjusting the resampling ratio $R_{SRC}$ includes: decreasing the resampling ratio $R_{SRC}$ to produce more samples when the filling level of the output buffer is below the target level of the output buffer; and increasing the resampling ratio $R_{SRC}$ to produce less samples when the filling level of the output buffer is above the target level of the output buffer.

In one aspect, tracking the filling level of the output buffer is performed at least in part with a digital phase-locked loop (DPLL). In another aspect, the samples are transferred from the output buffer to a host, either wirelessly or through a wired connection; and the samples are played as an output audio stream by a speaker of the host. In another aspect, the RX and the host are parts of a hearing aid.

In one embodiment, a non-transitory computer readable medium has computer executable instructions stored thereon that, in response to execution by one or more processors of a computing device, cause the computing device to perform actions including: receiving the audio data by an antenna of a receiver (RX), where the audio data is sent wirelessly from a transmitter (TX); storing the audio data in an input buffer of the RX; receiving data words from the input buffer by a sample rate converter (SRC), where consecutive data words are received from the input buffer at an adjustable period T; tracking a filling level of the input buffer; and based on the filling level of the input buffer, adjusting the adjustable period T.

In another aspect, the non-transitory computer readable medium also includes executable instructions for: comparing the filling level of the input buffer to a target level of the input buffer; increasing the adjustable period T when the filling level of the input buffer is below the target level of the input buffer; and decreasing the adjustable period T when the filling level of the input buffer is above the target level of the input buffer.

In another embodiment, the non-transitory computer readable medium also includes executable instructions for processing the data words from the input buffer by the SRC; storing the data words in an output buffer of the RX; tracking a filling level of the output buffer; comparing the filling level to the output buffer with a target level of the output buffer; and based on comparing the filling level to the output buffer with the target level of the output buffer, adjusting a resampling ratio $R_{SRC}$ by: decreasing the resampling ratio $R_{SRC}$ to produce more samples when the filling level of the output buffer is below the target level of the output buffer; and increasing the resampling ratio $R_{SRC}$ to produce less samples when the filling level of the output buffer is above the target level of the output buffer.

In one embodiment, a system for asynchronous transfer of audio data has an RX that includes: an input buffer configured to receive the audio data from a TX of the audio data; an input buffer level tracker configured to determine a filling level of the input buffer; and a sample rate converter (SRC) configured to consume the audio data from the input buffer by withdrawing data words at an adjustable period T. The adjustable period T is adjusted based on the filling level of the input buffer.

In one aspect, the system includes a host having a speaker for audio playback. In one aspect, the system is a hearing aid. In another aspect, the SRC can: compare the filling level of the input buffer to a target level of the input buffer; increase the adjustable period T to T+ΔT when the filling level of the input buffer is below the target level of the input buffer; and decrease the adjustable period T to T−ΔT when the filling level of the input buffer is above the target level of the input buffer. In one aspect, the input buffer tracker includes a moving-average filter.

In one aspect, the RX includes an output buffer for storing the data words processed by the SRC of the RX. In another aspect, the system also includes: an output buffer tracker configured to determine a filling level of the output buffer. The SRC may adjust a resampling rate ($R_{SRC}$) based on the filling level to the output buffer.

The following disclosure describes various embodiments of systems, associated methods and software for in-ear or near-ear acoustic readout of data from a hearing device. A person skilled in the art will also understand that the technology may have additional embodiments, and that the technology may be practiced without several of the details of the embodiments described below with reference to FIGS. 4-8.

Figure 4:
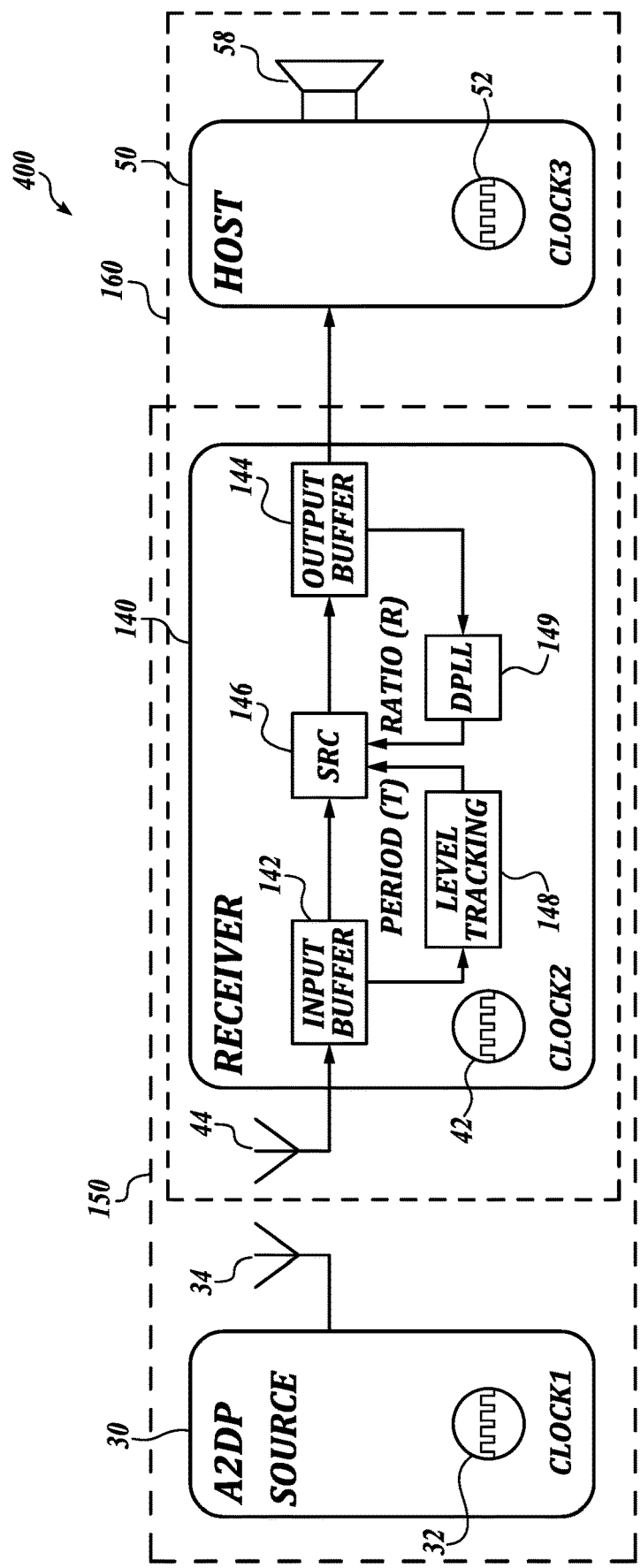
FIG. 4 is a schematic view of a wireless data system in accordance with an embodiment of the presently disclosed technology.

FIG. 4 is a schematic view of a wireless data system 400 in accordance with an embodiment of the presently disclosed technology. The wireless data system 400 includes a TX (source) 30 and an RX (sink) 140. Collectively, the TX 30 and the RX 140 may be termed a transceiver (TRX) 150. In some embodiments, the RX 140 forwards audio data to a host 50 in an asynchronous data link. The combination of the RX 140 and the host 50 may be an audio device capable of playing the audio stream over a speaker 58. An example of such an audio device 160 is a hearing aid, but other audio devices are also possible, for example, an ear-worn earbud, and a head-worn headset. The RX 140 and the host 50 may communicate wirelessly or through a wired connection. In some embodiments, a two-way communication may be established between the TX 30 and the RX 140, such that each of these devices becomes a transceiver capable of both sending and receiving data.

In operation, the TX 30 wirelessly transmits data to the antenna 44, and further to an input buffer 142 of the RX 140. In some embodiments, the RX 140 includes an output buffer 144 for storing the audio data before their transmission, wireless or wired, to the host 50 for the playback. Some examples of the input and output buffers are solid state volatile and non-volatile memory devices based on, for example, dynamic random access memory (DRAM) and flash memory.

In operation, a sample rate converter (SRC) 146 takes data (also referred to as "data words," "audio data," and "audio stream") from the input buffer 142, processes the data, and forwards the processed data to the output buffer 144. In some embodiments the SRC 146 draws (withdraws, receives) data from the input buffer 142 at the expiration of a predetermined time period T. Next, the SRC 146 processes the data by, for example, resampling the data, and storing the data in the output buffer 144. In different embodiments, the SRC may be a digital processor, a programmable controller, or other computing device.

With the asynchronous data transfer between the TX 30 and the RX 140, the rate of filling the input buffer 142 is controlled by the CLOCK1 of the TX 30, while the rate of the data withdrawal from the input buffer is controlled by the CLOCK2 of the RX 140. Therefore, even if the operation of the SRC 146 is initially synchronized to the ratio of the nominal frequencies of the CLOCK1 and CLOCK2, the frequency drift of the CLOCK1 may in time cause overfilling/underfilling of the input buffer 142. Furthermore, the dropped/resent data words may also contribute to the overfilling/underfilling of the input buffer 142.

In some embodiments, a level tracker 148 monitors the filling level of the input buffer 142. Based on the observed filling level, the time period T may be changed to facilitate faster or slower processing of the data words from the input buffer 142. For example, when the filling level of the input buffer 142 exceeds a predetermined threshold, the adjustable period T may be shortened to T−ΔT. As a result, the next data word will be drawn sooner, therefore biasing down the filling level of the input buffer. Conversely, when the level tracker 148 determines that the level of the input buffer is too high, the adjustable period T can be extended to T+ΔT to allow more time between the data withdrawals, therefore biasing up the filling level of the input buffer 142.

In some embodiments, the SRC 146 resamples the data from the input buffer 142 to the output buffer 144. For example, the SRC 146 may take a data word that includes N data points from the input buffer 142, and process (resample) that data word into another data word (audio stream) that includes M data points. The ratio of M:N is referred to as a ratio, a sampling ratio, a resampling ratio or an $R_{SRC}$. The data in the output buffer 144 are consumed by the host 50 for the playback at the speaker 58. The host 50 may rely on a clock 52 (CLOCK3) for the playback.

Because the withdrawal of the audio data from the output buffer 144 is controlled by the CLOCK3 of the host 50, which may be asynchronous with respect to the CLOCK2 of the RX 140, the output buffer 144 may also experience overfill/underfill issues. Therefore, in some embodiments, the RX 140 includes a level tracker 149 connected to the output buffer 144 and the SRC 146. The illustrated level tracker 149 is a digital phase-locked loop (DPLL) controller, but in other embodiments different implementations of the level tracker 149 are also possible. For example, the level tracker 149 may be an analog phase-locked loop controller or other controller capable of ascertaining the filling level of the output buffer 144. In different embodiments, other level trackers may be used, for example, the level trackers based on exclusive OR gates, edge triggered set-reset ("J-K") flip-flops, and phase frequency detectors.

In some embodiments, when the level tracker 149 determines that the filling level of the output buffer 144 is low, the $R_{SRC}$ may be decreased, therefore increasing the number of digital samples for storage in the output buffer 144, and increasing the filling level of the output buffer 144. Conversely, upon detecting that the filling level of the output buffer is high, the $R_{SRC}$ may be increased to resample the data by the SRC into shorter words (smaller N) thus reducing the filling level of the output buffer 144. The level tracker 149 may be a digital phase-locked loop (DPLL), but other implementations of the level tracker 149 are also possible, as described above with reference to the output buffer 144. In some embodiments, the adjustable period T and the ratio ($R_{SRC}$) may be controlled in parallel to achieve overall better balancing of the filling data in the input and output buffers, and to improve the quality of the audio signal emitted by the speaker 58.

Figure 5:
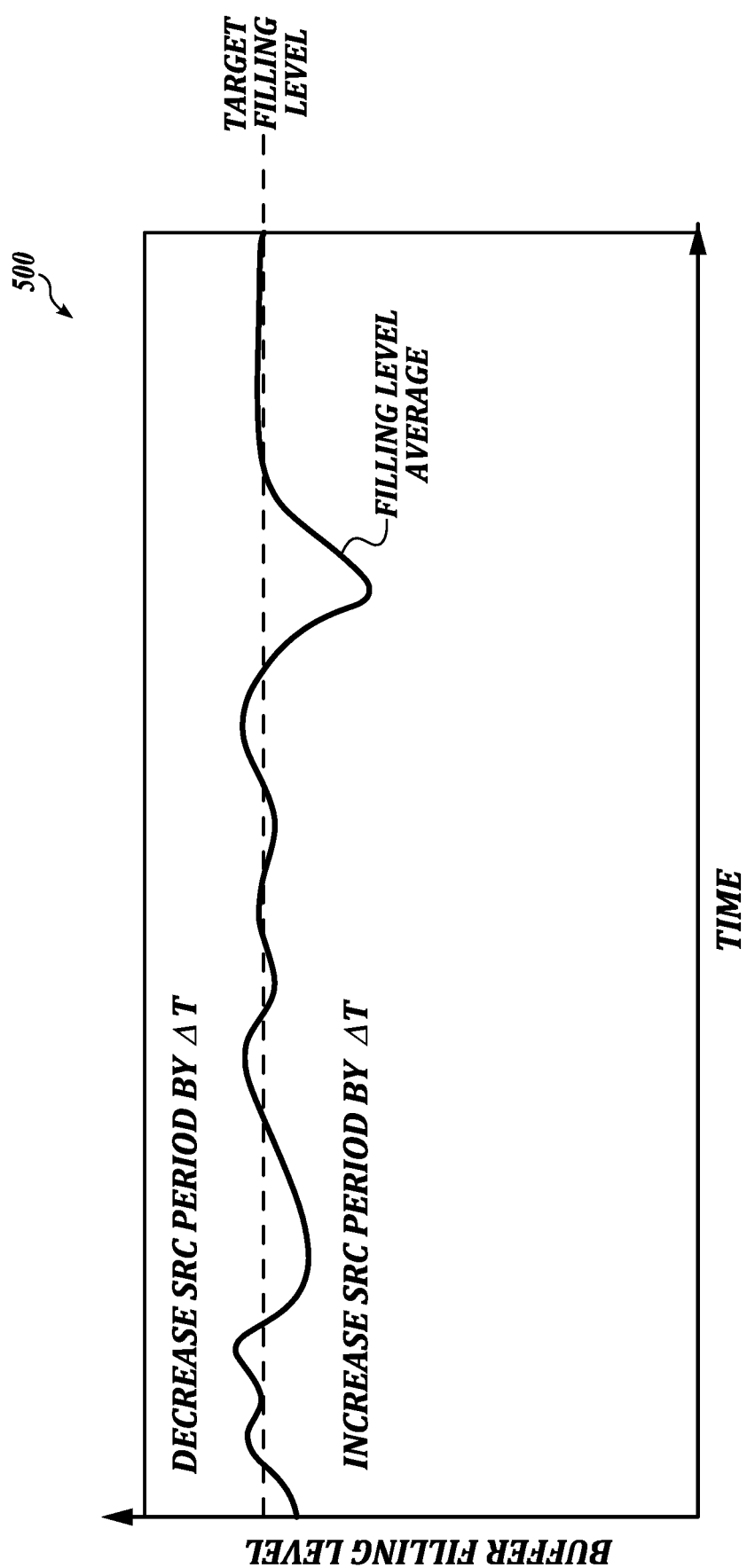
FIG. 5 is a graph of a filling level for an input buffer in accordance with an embodiment of the presently disclosed technology.

FIG. 5 is a graph 500 of a filling level for an input buffer in accordance with an embodiment of the presently disclosed technology. The vertical axis represents average buffer filling level expressed as, for example, the amount of buffer's memory filled with data, a number of data words, a filling level achieved by an audio stream for a duration of time without any consumption of the buffered data, etc. The horizontal axis represents time. A target filling level may be selectable, for example, 75% percent of the input buffer level, but other values are also possible. In some embodiments, the target filling level may be based on the drift of the CLOCK1, delays caused by the dropped words and retransmission, and the responsiveness of the buffer level measurement itself. In some embodiments, when the RX detects that the average filling level of the buffer is below the target, the adjustable period T is extended to T+ΔT to allow more time between the data withdrawals, thus allowing the filling level of the buffer to increase. Conversely, when the RX detects that the average filling level of the buffer is above the target, the adjustable period T is reduced to T−ΔT to withdraw data from the buffer faster, thus reducing the filling level of the buffer. In some embodiments, the period T may be 3-4 milliseconds (ms), and the increment ΔT may be 1 ms, but other values are also possible.

Figure 6:
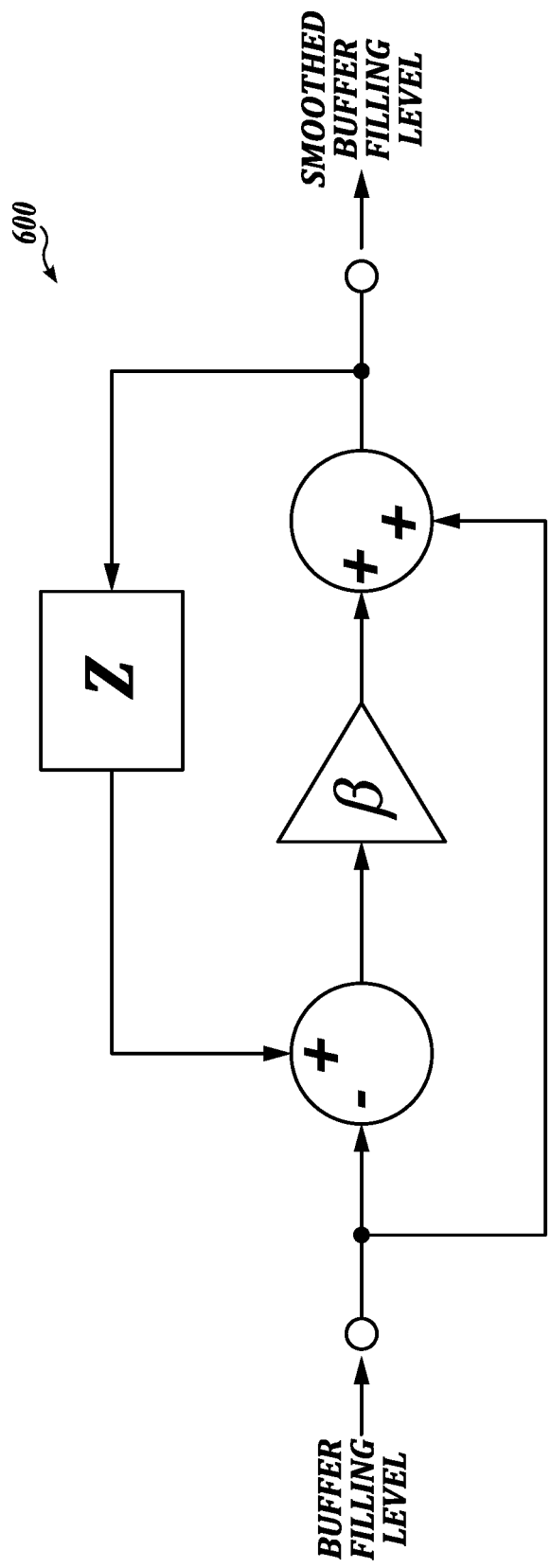
FIG. 6 is a schematic view of a data filter in accordance with an embodiment of the presently disclosed technology.

FIG. 6 is a schematic view of a data filter 600 in accordance with an embodiment of the presently disclosed technology. The illustrated data filter 600 is a first order moving-average filter having a time constant β and a feedback transfer function Z, but other filters are also possible, for example, a second order moving-average filter, or a median filter. In some embodiments, the moving-average filters may be exponential or weighted filters. The time constant β may be expressed as:

$$\beta = e^{-t/\tau} = e^{-1/\tau \cdot f_s}$$  Eq. (1)

where τ is the time constant that will determine the speed of convergence of the filter, and $f_s$ is the sampling rate. These parameters set a trade-off between the speed and smoothness of the filter. In some embodiments, the sampling rate $f_s$ may range between 250 Hz and 300 Hz, and the time constant T may be about 50 ms, but other values are also possible.

In operation, the illustrated data filter acts as another digital phase-locked loop (DPLL) that regulates the adjustable period T as shown in FIG. 4. For example, the data filter 600 may be combinable with the level tracker 148 in FIG. 4 to produce a smoothed buffer filling level that is fed to the SRC 146. As a result of the filter's operation, the operation of the SRC is smoothed and less dependent on spurious data word drop/retransmit events.

Figure 7:
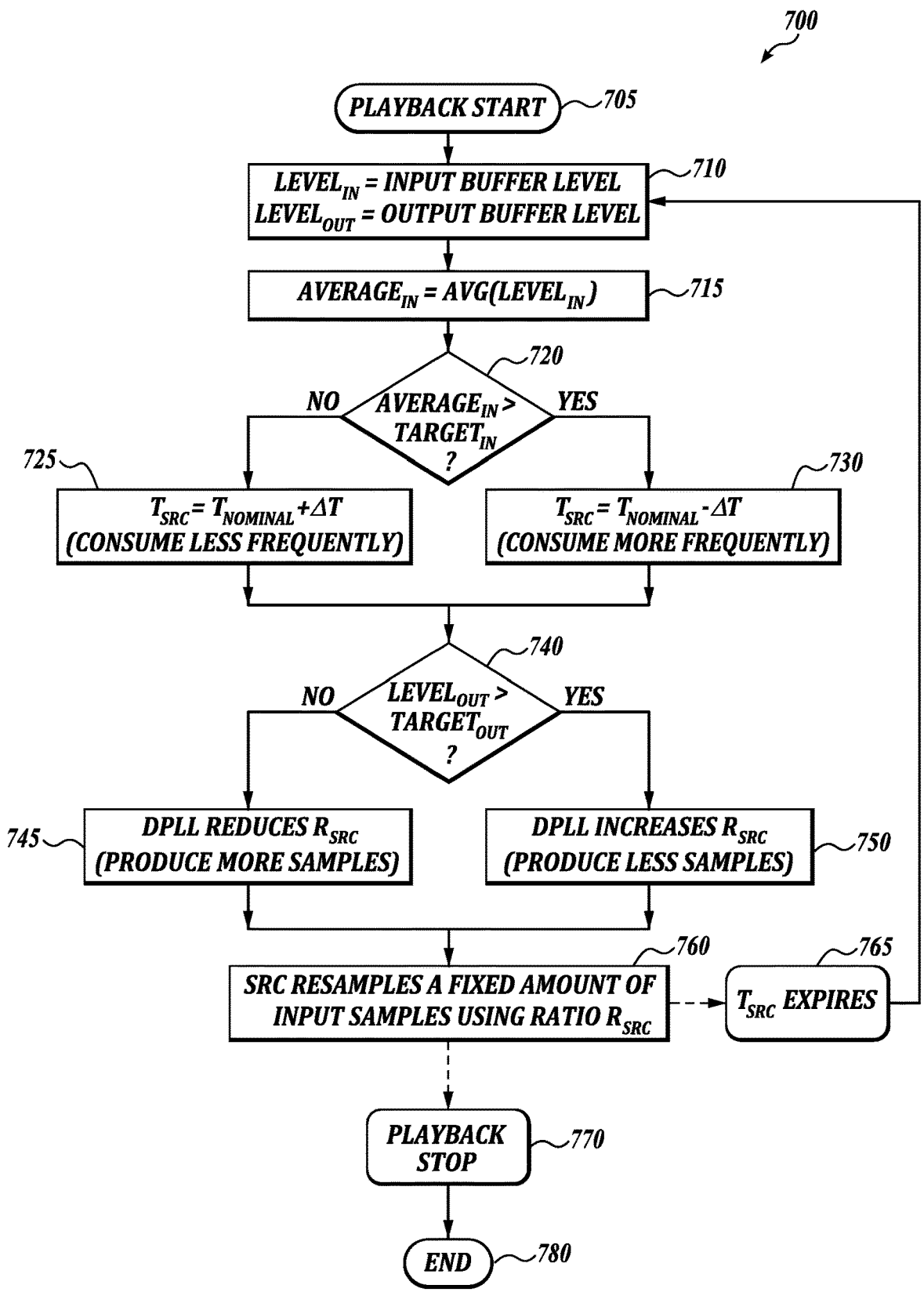
FIG. 7 is block diagram of a method for controlling buffer levels in accordance with an embodiment of the presently disclosed technology.

FIG. 7 is block diagram of a method 700 for playing the audio data while controlling buffer levels in accordance with an embodiment of the presently disclosed technology. In some embodiments, filling levels of the input buffer 142 and the output buffer 144 may be controlled using the method 700. In some embodiments, the block diagram may include additional steps or may be practiced without all steps illustrated in the diagram. In some embodiments, the order of the steps listed may be changed.

The method starts in block 705, and continues to block 710. In block 710, the target levels of the input buffer and the output buffer are set to $Level_{IN}$ and $Level_{OUT}$, respectively.

In block 715, an average level AverageIN is determined for the input buffer using, for example, the level tracker 148 and the data filter 600. In many practical applications, the changes in the level of the input buffer are dominated by the dropped and retransmitted data words, resulting in rapid changes over a relatively short period of time. Generally, controlling a level of a buffer that changes rapidly is difficult. Therefore, a data filter may be used to smooth these rapid variations. In some embodiment, the data filter is a first-order moving-average filter having a time constant shown in Eq. (1).

In block 720, a determination is made whether the average filling level of the input buffer Average is above the target level $Target_{IN}$. If the Average is below the target level TargetIN, the method proceeds to block 725, and the period $T_{SRC}$ between the successive withdrawals of the data words from the input buffer is extended to $T_{NOMINAL}+\Delta T$ to reduce the consumption of data from the input buffer. Conversely, if the average filling level of the input buffer is above the target level, the method proceeds to block 730 where the period $T_{SRC}$ is reduced to $T_{NOMINAL}-\Delta T$ to reduce the time between the data withdrawals by the sample rate converter (SRC), thus increasing the consumption of data from the input buffer. In some embodiments, the period $T_{SRC}$ may be 1-2 ms, 3-4 ms, or 5-10 ms, and the increment ΔT may be 1-5 μs, but other values are also possible depending on, for example, size of the input buffer 142 and the processing speed of the SRC 146.

In block 740, a determination is made whether the filling level of the output buffer $Level_{OUT}$ is above the target level $Target_{OUT}$. If the filling level of the output buffer is lower than the target level, the method proceeds to block 745 where the resampling ratio $R_{SRC}$ is reduced. In response, the SRC decreases the ratio of the input data points (M data points taken from the input buffer) to the output data points (N data points stored in the output buffer). Therefore, for a fixed number of the input data points, more output data points are produced and stored in the output buffer. As a result, the filling level of the output buffer increases. Conversely, if the filling level of the output buffer is above its target level, the method proceeds to block 750 where the $R_{SRC}$ is increased to produce less data points (samples) for the output buffer, thus reducing the filling level of the output buffer.

In block 760, the SRC resamples the data from the data words from the input buffer. In some embodiments, the filling level of the output buffer may be averaged using, for example, filters analogous to those described with respect to FIG. 6.

In block 765, the time $T_{SRC}$ between the successive withdrawals of the data words from the input buffer has expired, and the method proceeds back to block 710. In block 770, the playback stops, because, for example, the entire audio stream has been played back. The method ends in block 780. The block diagram 700 may be executed by the receiver 140, which may be part of the hearing aid 160.

Figure 8:
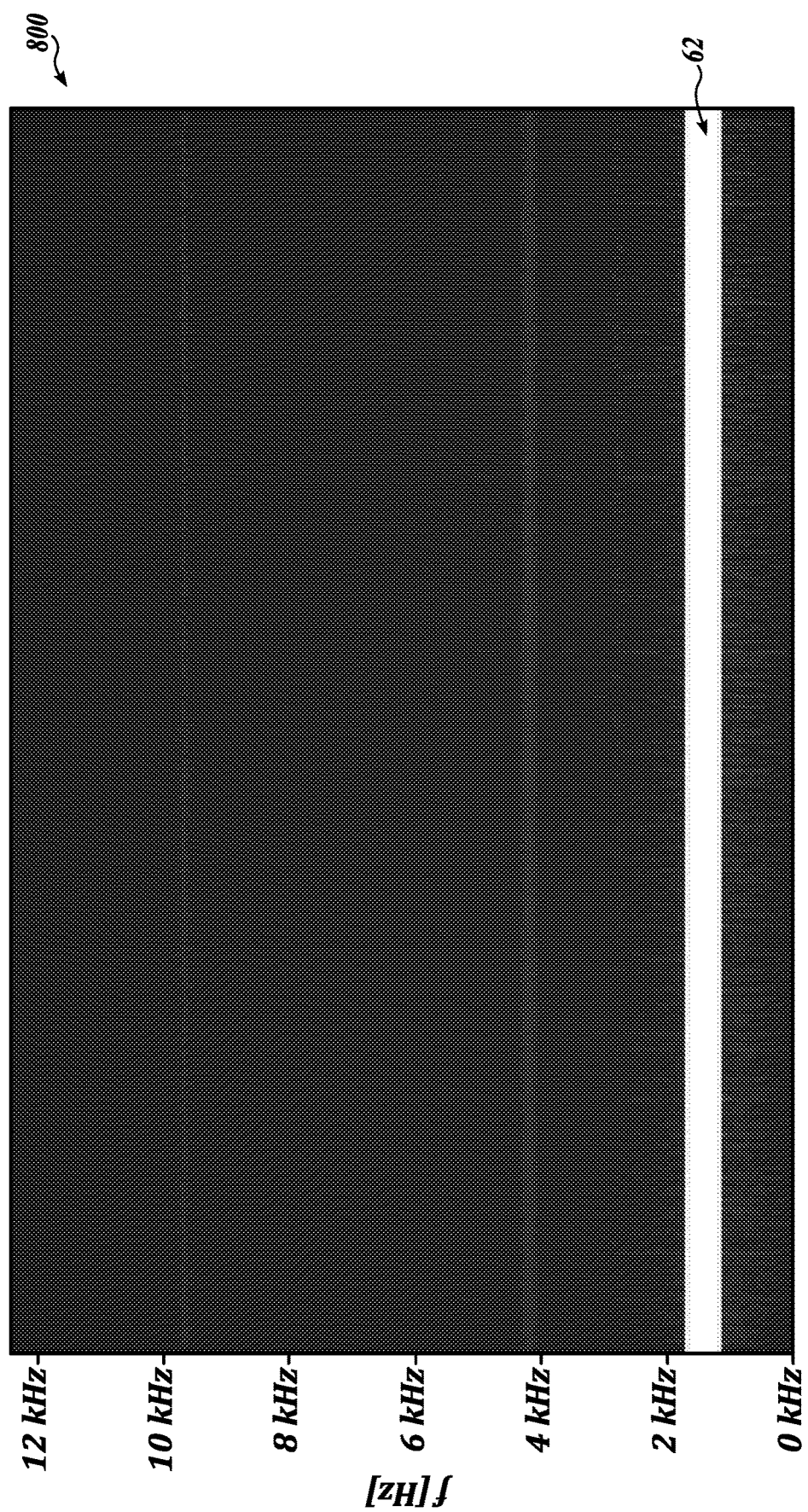
FIG. 8 is a spectrogram of a pure tone stream in accordance with an embodiment of the presently disclosed technology.

FIG. 8 is a spectrogram 800 of a pure tone stream in accordance with an embodiment of the presently disclosed technology. The horizontal axis of the spectrogram corresponds to the audio playback time in seconds. The vertical axis corresponds to the frequencies of the audio signal as played by, for example, the speaker 58 of the host 50. In the illustrated embodiment, the source emitted a pure tone 62. The RX 140 processed the pure tone 62 using, for example, the method 700 or some parts of the method 700. The pure tone 62 was played by the speaker 58 and reproduced in the spectrogram 800. With the illustrated spectrogram, the reproduced pure tone includes less noise due to improved control of the filling level of the buffer(s) levels. Furthermore, the incidence of the data buffer overflow/underflow is eliminated or at least reduced.

Many embodiments of the technology described above may take the form of computer-executable or controller-executable instructions, including routines stored on non-transitory memory and executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. In many embodiments, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A method for an asynchronous transfer of audio data, comprising:
   receiving the audio data by an antenna of a receiver (RX), wherein the audio data is sent wirelessly from a transmitter (TX);
   storing the audio data in an input buffer of the RX;
   receiving data words from the input buffer by a sample rate converter (SRC), wherein consecutive data words are received from the input buffer at an adjustable period T;
   tracking a filling level of the input buffer;
   comparing the filling level of the input buffer to a target level of the input buffer; and
   based on the filling level of the input buffer, adjusting the adjustable period T by:
      increasing the adjustable period T when the filling level of the input buffer is below the target level of the input buffer, and
      decreasing the adjustable period T when the filling level of the input buffer is above the target level of the input buffer.

2. The method of claim 1, further comprising:
   before comparing the filling level of the input buffer to the target level of the input buffer, processing the data words with a moving-average filter.

3. The method of claim 2, wherein the moving-average filter has a time constant $\beta$:

$$\beta = e^{-\frac{1}{\tau \cdot f_s}}$$

where $\tau$ is a time constant of the filter, and $f_s$ is a sampling rate of the filter.

4. The method of claim 1, further comprising:
   processing the data words from the input buffer by the SRC; and
   storing the data words in an output buffer of the RX.

5. The method of claim 4, wherein processing the data words from the input buffer by the SRC comprises resampling of the data words, the method further comprising:
   tracking a filling level of the output buffer;
   comparing the filling level to the output buffer with a target level of the output buffer; and
   based on comparing the filling level to the output buffer with the target level of the output buffer, adjusting a resampling ratio $R_{SRC}$.

6. The method of claim 5, wherein adjusting the resampling ratio $R_{SRC}$ comprises:
   decreasing the resampling ratio $R_{SRC}$ to produce more samples when the filling level of the output buffer is below the target level of the output buffer; and
   increasing the resampling ratio $R_{SRC}$ to produce less samples when the filling level of the output buffer is above the target level of the output buffer.

7. The method of claim 5, wherein tracking the filling level of the output buffer is performed at least in part with a digital phase-locked loop (DPLL).

8. The method of claim 4, further comprising:
   transferring samples from the output buffer to a host; and
   playing the samples as an output audio stream by a speaker of the host.

9. The method of claim 8, wherein the RX and the host are parts of a hearing aid.

10. The method of claim 8, wherein the RX and the host are parts of a headset or an earbud.

11. The method of claim 1, wherein the audio data is sent wirelessly from the transmitter (TX) using a Bluetooth protocol or an Advanced Audio Distribution Profile (A2DP) protocol.

12. A non-transitory computer-readable medium having computer-executable instructions stored thereon that, in response to execution by one or more processors of a computing device, cause the computing device to perform actions comprising:
   receiving audio data by an antenna of a receiver (RX), wherein the audio data is sent wirelessly from a transmitter (TX);
   storing the audio data in an input buffer of the RX;
   receiving data words from the input buffer by a sample rate converter (SRC),
      wherein consecutive data words are received from the input buffer at an adjustable period T;
   tracking a filling level of the input buffer;
   comparing the filling level of the input buffer to a target level of the input buffer; and
   based on the filling level of the input buffer, adjusting the adjustable period T by:
      increasing the adjustable period T when the filling level of the input buffer is below the target level of the input buffer; and
      decreasing the adjustable period T when the filling level of the input buffer is above the target level of the input buffer.

13. The non-transitory computer-readable medium of claim 12, wherein the computing device performs actions further comprising:
   processing the data words from the input buffer by the SRC;
   storing the data words in an output buffer of the RX;
   tracking a filling level of the output buffer;

comparing the filling level to the output buffer with a target level of the output buffer; and
based on comparing the filling level to the output buffer with the target level of the output buffer, adjusting a resampling ratio $R_{SRC}$ by:
decreasing the resampling ratio RSRC to produce more samples when the filling level of the output buffer is below the target level of the output buffer; and
increasing the resampling ratio RSRC to produce less samples when the filling level of the output buffer is above the target level of the output buffer.

14. A system for asynchronous transfer of audio data, the system having a receiver (RX) comprising:
an input buffer configured to receive the audio data from a transmitter (TX) of the audio data;
an input buffer level tracker configured to determine a filling level of the input buffer; and
a sample rate converter (SRC) configured to consume the audio data from the input buffer by receiving data words at an adjustable period T, wherein the adjustable period T is adjusted based on the filling level of the input buffer, and wherein the SRC is configured to:
compare the filling level of the input buffer to a target level of the input buffer;
increase the adjustable period T when the filling level of the input buffer is below the target level of the input buffer, and
decrease the adjustable period T when the filling level of the input buffer is above the target level of the input buffer.

15. The system of claim 14, further comprising a host having a speaker for audio playback.

16. The system of claim 15, wherein the system is a hearing aid.

17. The system of claim 15, wherein the system is a headset or an earbud.

18. The system of claim 17, wherein the input buffer tracker comprises a moving-average filter.

19. The system of claim 17, wherein the RX comprises an output buffer configured for storing the data words processed by the SRC of the RX.

20. The system of claim 19, further comprising:
an output buffer tracker configured to determine a filling level of the output buffer,
wherein the SRC is configured to adjust a resampling rate ($R_{SRC}$) based on the filling level to the output buffer,
wherein the SRC is configured to:
compare the filling level of the output buffer to a target level of the output buffer,
decrease the $R_{SRC}$ to produce more samples when the filling level of the output buffer is below the target level of the output buffer, and
increase the $R_{SRC}$ to produce less samples when the filling level of the output buffer is above the target level of the output buffer; and
wherein the output buffer tracker comprises a digital phase-lock loop (DPLL).

* * * * *